US009713780B2

(12) United States Patent  
Hays et al.

(10) Patent No.: US 9,713,780 B2  
(45) Date of Patent: Jul. 25, 2017

(54) FOUR PHASE VERTICAL ROTARY SEPARATOR

(71) Applicants: Lance G. Hays, Costa Mesa, CA (US); Shawn Barge, Orange, CA (US)

(72) Inventors: Lance G. Hays, Costa Mesa, CA (US); Shawn Barge, Orange, CA (US)

(73) Assignee: Energent Corporation, Santa Ana, CA (US)

( * ) Notice: Subject to any disclaimer, the term of this patent is extended or adjusted under 35 U.S.C. 154(b) by 200 days.

(21) Appl. No.: 14/121,632

(22) Filed: Oct. 1, 2014

(65) Prior Publication Data

US 2016/0096123 A1    Apr. 7, 2016

(51) Int. Cl.
| | |
|---|---|
| *B01D 19/00* | (2006.01) |
| *B01D 21/26* | (2006.01) |
| *B01D 21/24* | (2006.01) |
| *B04B 1/02* | (2006.01) |
| *B04B 11/02* | (2006.01) |
| *B04B 11/04* | (2006.01) |
| *B04B 11/06* | (2006.01) |
| *B01D 17/02* | (2006.01) |

(52) U.S. Cl.  
CPC ....... *B01D 21/262* (2013.01); *B01D 17/0217* (2013.01); *B01D 19/0057* (2013.01); *B01D 21/2494* (2013.01); *B04B 1/02* (2013.01); *B04B 11/02* (2013.01); *B04B 11/04* (2013.01); *B04B 11/06* (2013.01)

(58) Field of Classification Search  
CPC ............. B01D 21/262; B01D 17/0217; B01D 19/0052; B01D 19/0057

USPC ......... 96/182, 204, 208, 209, 212, 214, 216; 95/253, 261, 262, 269–271; 210/767, 210/787, 788  
See application file for complete search history.

(56) References Cited

U.S. PATENT DOCUMENTS

| | | | | |
|---|---|---|---|---|
| 3,140,257 | A * | 7/1964 | Wilder, Jr. ............. | B01D 21/02 210/114 |
| 4,339,923 | A * | 7/1982 | Hays ....................... | F01K 25/06 415/88 |
| 5,750,040 | A * | 5/1998 | Hays ...................... | B01D 17/00 210/767 |
| 6,090,299 | A * | 7/2000 | Hays ....................... | B01D 17/00 210/360.1 |
| 6,716,269 | B1 * | 4/2004 | Graff ...................... | B01D 53/24 55/343 |
| 8,388,739 | B2 * | 3/2013 | Cash ................... | B01D 53/1462 95/226 |
| 8,491,253 | B2 * | 7/2013 | Hays ........................ | F02C 1/00 415/48 |
| 2005/0039604 | A1 * | 2/2005 | Hallgren ................ | B01D 45/12 96/281 |

* cited by examiner

*Primary Examiner* — Frank Lawrence  
(74) *Attorney, Agent, or Firm* — William W. Haefliger

(57) ABSTRACT

A compact rotating separator apparatus to which a fluid stream containing gas, two liquids of different density, and solids is supplied via nozzles or exhaust from a process component; and which employs high centrifugal forces to produce pure streams of the gas, each of the liquids, and a waste stream containing the solids. The energy in the fluid stream is converted to shaft power in the rotating separator apparatus and can be used to generate power. Oil, gas, water and solids from a production well can be directly separated into the constituent streams while producing useful power.

28 Claims, 3 Drawing Sheets

Figure 1A:
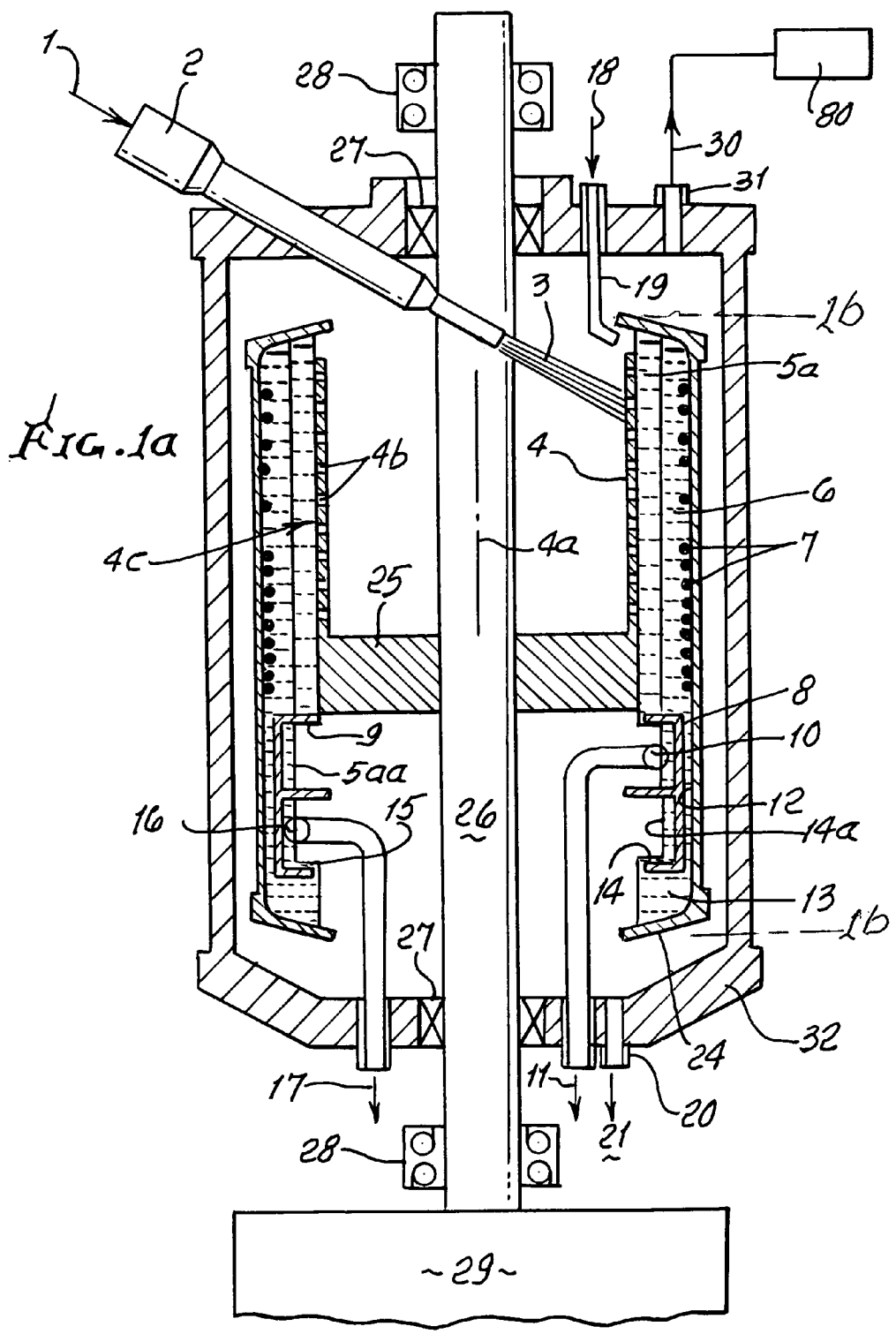

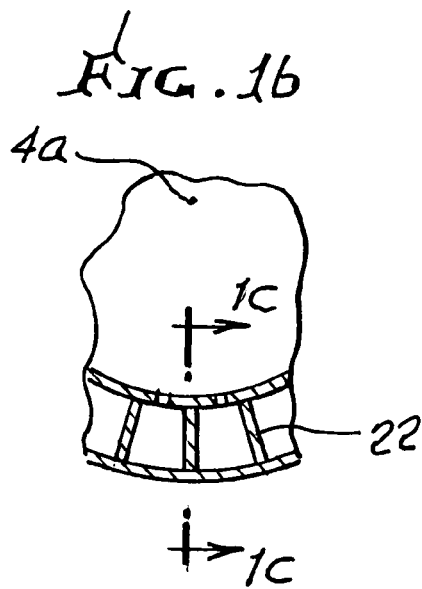
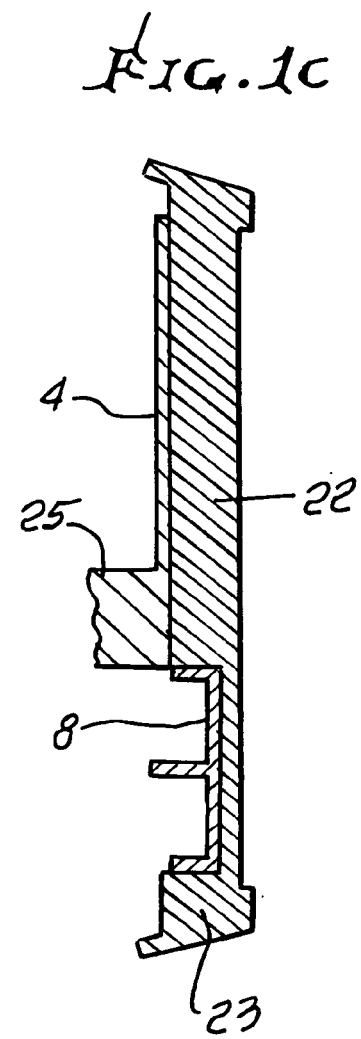
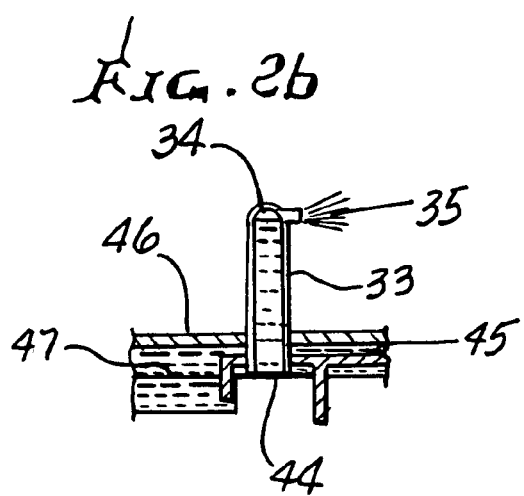

FOUR PHASE VERTICAL ROTARY SEPARATOR

BACKGROUND OF THE INVENTION

This invention relates generally to centrifugal separation of multiple fluid phases: gas; Liquid A and Liquid B, which differ by density; and solids; and more particularly concerns achieving such separation using compact rotating separator apparatus. In addition, the invention concerns methods of operating rotating separator apparatus in relation to scoop means immersed in liquid rings on the rotating separator. In addition, the invention concerns methods of operating rotating separator apparatus in relation to gas and liquid reaction means, to remove gas and liquid from the rotating separator, and to add energy to the rotating apparatus from the fluid stream supplied to the rotating separator from, for example, a high pressure oil and gas production well. The invention also concerns removal of any solids, without interruption of the process, and with a minimum amount of waste stream discharge.

In existing separation methods, a large gravity separation tank is typically used, and only partial separation of liquids, with different densities, is achievable. Accordingly, additional treatment is required for separating the constituents. Secondary treatment methods require expenditure of large amounts of power, as for example via high speed centrifuges, or heat and chemicals to break down emulsions or foam. Removing solids becomes difficult and often requires shutting down a process to manually remove them. Some processes also result in significant levels of foam created from the release of gases during separation, which includes a pressure let down stage. Foam generated can interfere with the separation processes requiring very large vessels, lower process flows, and/or injection of chemicals to accommodate foam breakdown.

A prior offshore platform installation required nine large gravity separation vessels. Such vessels weighed 668 metric tons and required 266 square meters of deck space. There is need for compact rotating separators of the type provided by the present invention, with 100% redundancy, typically reducing the weight of separation equipment to 65 metric tons and reducing needed deck space to only 20 square meters. The compact means of such separation in one installation incorporating the present invention were estimated to result in equipment and platform cost savings of over $100 million. Also, it was found that the energy in the oil and gas mixture could be converted to 24 megawatts of electrical energy by the rotating separator apparatuses, potentially eliminating a large gas turbine from the platform. In addition to such cost savings, the generation of power from the resulting process energy, instead of burning or flaring gas, would reduce the emissions of carbon dioxide by as much as 150,000 metric tons per year.

Partial achievement of these objectives has been achieved by the rotating separator technology disclosed by Hays, U.S. Pat. No. 5,750,040. That invention achieves certain of the aforementioned benefits for two-phase separation (gas and single liquid phase separation) but not completely useful for four phase separation. With the rotating separator of that invention, a method for discharge of a continuous waste stream of solids and contaminated water is provided. Because of the need to provide a large opening to pass the largest particles in the waste flow. A large waste stream is produced and there are objectionable environmental consequences. The process of U.S. Pat. No. 5,750,040 also results in unconstrained vortex flow in the separated liquid phases. This result has been found to interfere with the hydrostatic pressure balance necessary to achieve controlled separation of liquids of different density. That process also involves immersion of a liquid scoop directly in a layer of separated liquid, which causes turbulence and disturbance to the surface, disturbing the hydrostatic pressure balance.

SUMMARY OF THE INVENTION

It is a major object of the present invention to provide a simple, effective method and apparatus meeting the above needs and overcoming problems as described. The above object is met by operating a rotating separator apparatus to which fluid, including gas and liquids, and solids, are supplied in a fluid jet, as via a nozzle or exhaust from a process component, and involving steps as follows:

a) separating gas from said stream at a first zone within said rotating separator apparatus, b) separating liquids from said stream into separate layers of different density at a second zone within said rotating separator apparatus, and c) removing said separated gas and separated liquids of different density from the said first and second zones of said rotating separator apparatus.

More specifically, the process includes:

1. separating the liquids and solids from the gas in the stream, at a first zone within the rotating apparatus,
2. separating the liquids into liquids of different density at a second zone within the apparatus,
3. providing longitudinal vane structures operating to constrain the separated liquid layers to rotate at the velocity of the rotating structure, at any radius,
4. providing weirs operating to control the hydrostatic pressure balance and isolate the surfaces of the separated liquid layers from disturbances produced by liquid removal means,
5. removing the separated liquids from the weir structure, which isolates the surface or surfaces of the separated liquid layers from any disturbances, and
6. separating, fluidizing and removing the solids at a third zone, and periodically discharging them from the rotating separator apparatus in a controlled, limited waste stream.

As will appear, the fluid jet stream has momentum which is utilized by transfer of energy from the jet to the rotating separator apparatus. Power may also be transferred from an external source to the rotating separator.

It is another object to provide method and apparatus to achieve complete separation of gas, Liquid A, Liquid B and solids, that is self-regulating, operating either by the four-phase fluid energy or by a supplementary motor drive. The rotary separator apparatus is self-regulating to handle widely varying ratios of gas and liquids with no external controls.

A further object is the removal from the fluid jet of entrained solid particles; the method including providing a tapered lip on the rotating separator apparatus allowing the solids to drop to the bottom of the housing, and including removing the particles which are separated by transfer to the bottom of the housing. The solids may alternatively be removed in a different operating mode, when the primary nozzle jet is not operating, by a separate high pressure jet that fluidizes and mechanically forces the solids from the separator wall, allowing them to flow to the housing bottom and drain out.

Another object is providing power recovery from the pressure let down of the jet from the nozzle, or a turbine, in the form of thrust. The thrust from the jet may be transferred to the rotating separator apparatus, by frictional forces acting upon the rotating separator apparatus and by reaction forces produced by gas or liquid reaction nozzles.

These and other objects and advantages of the invention, as well as the details of an illustrative embodiment, will be more fully understood from the following specification and drawings, in which:

DRAWING DESCRIPTION

Figure 2A:
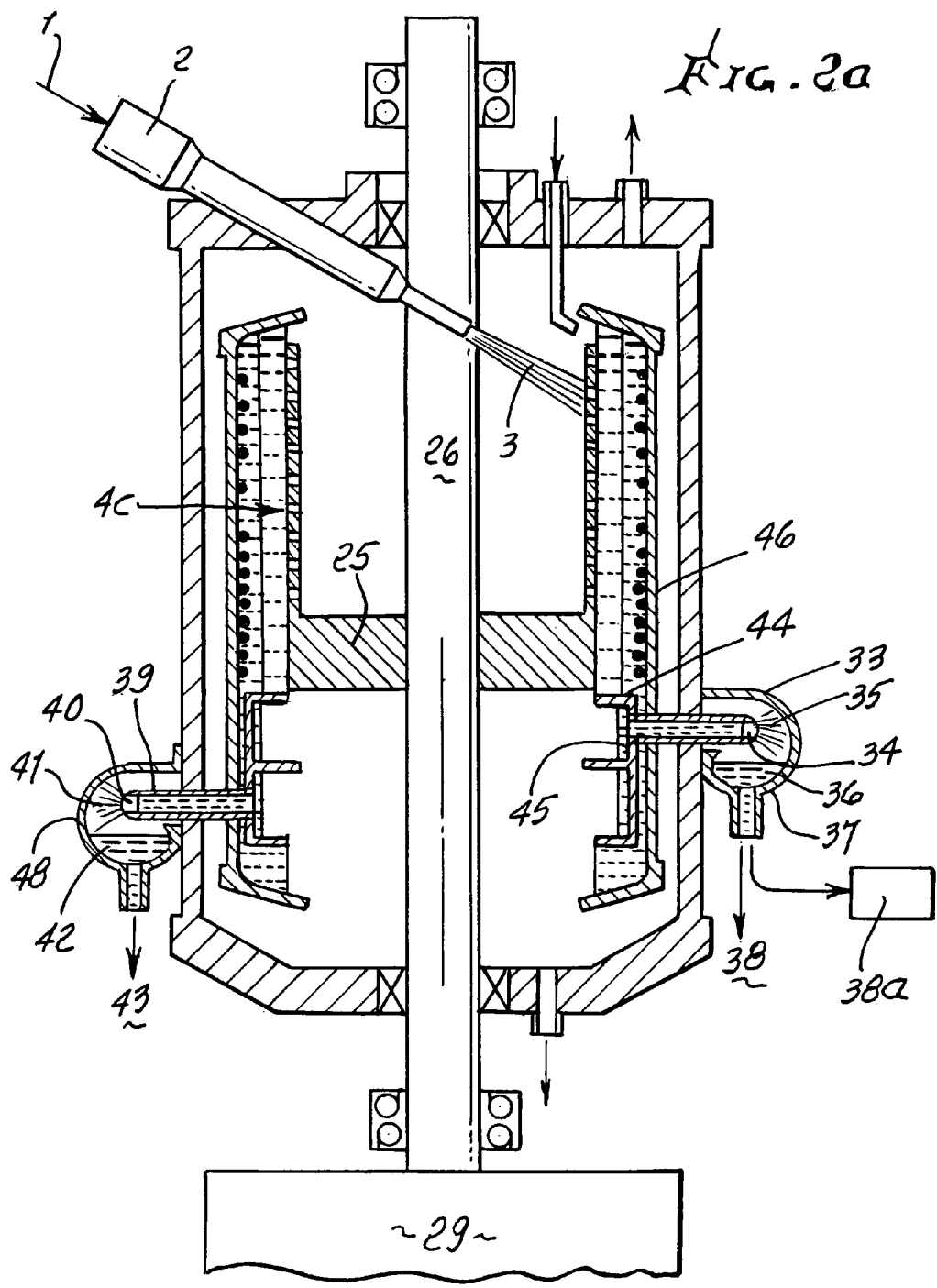

FIG. 1a is a section view that shows details of the apparatus;
FIG. 1b is a fragmentary section, taken on lines 1b-1b of FIG. 1a;
FIG. 1c is a section taken on lines 1c-1c of FIG. 1b;
FIG. 2a is like FIG. 1a but shows modification; and
FIG. 2b is a fragmentary view showing further modification.

DETAILED DESCRIPTION

FIG. 1a shows a version of the four phase separator structure. A mixture of multiple liquids and gas, 1, is expanded in a nozzle, 2. The resulting gas and liquid jet, 3, is well collimated. The jet impinges generally tangentially onto a rotating surface, 4, the axis of rotation shown at 4a. The surface is solid, with holes 4b to permit drainage of the liquids and solids. The centrifugal force acting upon the liquids and solids results in the formation of a separated layer including the lighter liquid, 5a, and heavier liquid, 6. In addition, the solids, 7, are centrifuged to the outer radius of the rotating separator 4c.

The liquids flow axially towards a circumferential structure, 8. The lighter of the two liquids flows over the inner radius of the structure (the "weir") forming a liquid layer, 9. The separated light liquid forms a liquid layer at 5aa within the structure in which a scoop, 10, is immersed. The liquid flowing into the scoop leaves, at scoop outlet 11, to flow to another part of the process. The heavier liquid, 6, flows through a passage, 12, which is radially outward from the structure, 8. The heavy liquid forms a layer 13, and flows over a structure, 14, into a separate channel. The heavy liquid flowing over the structure 14 forms a liquid layer, 14a, before being collected in the structure. A separate scoop, 16, is provided to remove the heavy liquid and transfer that pure liquid, 17, to another part of the process.

The relative location of the interface, of lighter liquid 5a, formed between a liquid B and a liquid A, is determined by a balance of the hydrostatic pressure of the height of the layer of liquid B plus the height of the layer of liquid A, and the height of the layer of pure heavy liquid A, 13. In forming the apparatus, account must be taken of the height of the layer of liquid B flowing over the end of the structure, 8, the pressure drop of liquid A flowing in the passage, 12, and the height of the layer of liquid A, 15, flowing over the structure, at 14.

The separated solids, 7, can periodically be removed by introduction of a high-pressure fluid, 18, into a nozzle structure 19. The resulting high velocity liquid is directed to dislodge the solid particles and entrains them in a flow over the rotating separator lip, 24, into the bottom of the casing, 32, where they are discharged through a port, 20 into another part of the process, 21.

As shown in FIG. 1b, a partial cross section of the apparatus, longitudinal vanes, 22, are provided to force the separated liquid A, and liquid B into solid body rotation. The vane structure is extended, 23, into the pure liquid A, at 13, to ensure solid body rotation in that area also.

The rotating separator apparatus is supported from a shaft, 26, by a multiplicity of support members, 25. The shaft is supported by bearings, 28, to permit a freely rotating structure. A generator or motor, 29, is provided to extract power from the fluid energy or to add power, to ensure the required RPM for separation is achieved. Seals, 27, are provided to prevent leakage from the apparatus.

The separated gas, 30, leaving the casing 32 flows to an exit port, 31, and is transported to another part of the process, indicated at 80.

Another means of extracting pure liquids A and B is shown in FIGS. 2a and 2b. The separated pure liquid layer, 44, flows into a structure, 33, which may be tubular or rectangular in cross-section. Under the action of the centrifugal force field produced by the motion, the liquid B flows radially outward and acquires a hydrostatic pressure at the outer periphery of the liquid and then is expanded through a nozzle 34, which produces a high velocity jet of liquid B, at 35. The high velocity liquid adds a torque to the rotating separator assembly which produces power to drive the generator or reduce the power required by a motor to achieve rotation. The reaction structure, 33, passes through the inner wall of the channel, 45, passes through the passage occupied by liquid A, at 47, and subsequently passes through the wall of the rotating separator, 46.

The discharge from the nozzle is collected in a stationary volute, 37, which is attached to the wall of the casing. The pure liquid B is collected and forms a liquid interface, at 36, and flows out, at 38, to be collected at 38a in another part of the process. The reaction structure, 39, is also provided for liquid A. Pure liquid A is discharged through the nozzle, 40, forming a high velocity jet, at 41. Liquid is subsequently collected in a volute, 48, forming a liquid interface at 42, which flows at 43 to another part of the process.

The interface location is independent of the relative amounts of Liquid A and Liquid B, so long as the pressure drop of the liquids flowing from the interface location to the outlets is small compared to the large centrifugally-induced head from the rotating liquids and so long as the heights of the liquid layers flowing over structures 8 and 14 are small compared to the thickness of the liquid layers, 5 plus 6, and 13.

For this case, the balance of forces on the liquid layers at structure 8 and the liquid layer at structure 14 is:

$$\rho_b \omega (r_i^2 - r_b^2) = \rho_a \omega (r_i^2 - r_a^2)$$

where
$\rho_a$=density of liquid A
$\rho_b$=density of liquid B
$r_i$=radius to interface between liquid A and liquid B
$r_a$=radius to surface of layer of liquid A
$r_b$=radius to surface of layer of liquid B
$\omega$=rotational speed of rotating separator (in revolutions per second for example)

The liquid outlets are typically open scoops though it is feasible to add moveable barrier walls which raise and lower with the fluid level preventing gas from becoming entrained in the scoop.

If the tangential velocity of the gas and liquid jet impinging on the separating surface is greater than the rotating surface speed, the liquids will be slowed by frictional forces transferring power to the separating surface and hence to the rotor and shaft. If the tangential velocity of the jet is lower than the desired rotating surface speed, external power must be transferred to the shaft, and hence rotor and separating surface, to drag the slower liquids up to the speed of the rotating surface. The power can be transferred, for example, by a motor, or by the shaft of another rotary separator.

Referring to FIG. 1a, the structure, 8, is designed to force the heavier liquid to flow through a structure defined passage located radially outward from the two liquid interface surface.

As shown in FIG. 1b, another feature is longitudinal vanes, 22, within the separated liquid layers. These vanes prevent the liquid layers from forming a free vortex flow with different hydrostatic forces than those necessary for proper separation.

The solids, being the heaviest of the components in the stream, are thrown to the inner side of the wall, 7. Such solids can remain trapped during operation and cleaned out when the separator is stopped, or alternatively, a separate, high pressure jet from a nozzle, 19, can be used to fluidize and mechanically remove solids that have become attached to the inner wall. The solids flow down the separator and drop out of the angled lip, 24, at the bottom of the separator to a separate exit port, 20.

Further features of the invention include:
1. Operation of rotating separator apparatus to which fluid including gas and liquids and solids are supplied in a fluid jet and in which the following steps are included:
   a) separation of gas from said stream at a first zone within said rotating separator apparatus,
   b) separation of the liquids into separate layers of different density at a second zone within said rotating separator apparatus,
   c) removal of the separated pure gas stream and separated pure stream of liquids of different density from the said rotating separator apparatus,
   d) provision of a vertical shaft to support said first and second zone forming rotating structures,
   e) provision of a casing containing bearings to support the shaft to freely rotate, casing associated seals to contain all said fluids, and means to remove the said separated streams of fluids.
2. Longitudinal vanes are provided to force the separated liquids to acquire the rotational velocity of the rotating apparatus at any radius ("solid body rotation").
3. Scoops are provided and are immersed in one or more of the separated liquids traveling relative to the scoop to remove the separated liquid.
4. Liquid reaction passages are provided and immersed in one or more of the separated liquids to remove the separated liquid without a scoop.
5. A formed fluid jet has momentum and is directed to transfer energy from the jet to said rotating separator apparatus.
6. A rotating annular surface is formed and at which the liquids are separated from the gas.
7. The rotating surface is provided with a multitude of holes to pass liquid centrifugally away from gas in such a manner as to eliminate the transfer of forces from the fluid jet that would disrupt the separated liquids.
8. Annular structure is provided to separately collect liquid A of higher density and liquid B of lower density.
9. The annular structure has two separate annular circular plates ("weirs") having different radii for the inner circumference of said plates. The radii to the surface of the weirs are determined by the specific gravity of liquid A and liquid B and the centrifugal forces produced by the rotation of the apparatus.
10. The annular structure has a third annular circular plate with a smaller radius than either of the two weirs, preventing splash from one separated liquid into another and forming discrete channels for each separated liquid.
11. The liquid reaction passages lead to a nozzle which converts the hydrostatic head produced by the centrifugal force field to kinetic energy, producing a torque on the rotating separator structure.
12. The liquid reaction passages are discharged into stationary volutes attached to the casing.
13. The method including:
   a) provision of a fluid means to periodically fluidize any solids within the rotating apparatus and to force the resulting solid liquid mixture to flow in a generally downward direction,
   b) provision of a vertical shaft and sloping end walls of the rotating separator apparatus to enable removal of said fluidized solids by gravity,
   c) provision of a port at the bottom of the casing to enable removal of the fluidized and formed solid mixture.
14. The scoops are contoured to convert the kinetic energy of the captured liquids into pressure.
15. Formed reaction passages are immersed in the separated gas to add energy to the rotating separator apparatus.
16. An electric generator is attached to the rotating shaft to produce electric power.
17. A motor is attached to the shaft to cause rotation of the rotating separator apparatus.
18. A pump is attached to the shaft.
19. A compressor is attached to the shaft.
20. The fluids are natural gas, oil, water and solids.
21. The fluids are carbon dioxide, liquid hydrocarbons, amine solution and solids.

We claim:
1. The method of operating a rotating separator apparatus to which fluid, including gas, and liquids, and solids are supplied in a fluid stream, which includes the following steps:
   a) separating gas from said stream at a first zone within said rotating separator apparatus,
   b) separating liquids from said stream into separate layers of different density at a second zone within said rotating separator apparatus, and
   c) removing said separated gas and separated liquids of different density from the said first and second zones of said rotating separator apparatus,
and wherein liquid reaction passages are provided and immersed in one or more of the separated liquids to remove the separated liquid,
and wherein wherein said liquids in said liquid reaction passages are discharged into stationary volutes attached to a separator casing.
2. The method of claim 1 including providing a vertical shaft supporting said zones.
3. The method of claim 2 including providing the casing containing bearings to support the shaft to freely rotate, providing seals to contain all said liquids, and means to remove the said separated liquids.
4. The method of claim 1 wherein longitudinally elongated vanes are provided and located to force the separated liquids to acquire the rotational velocity of the rotating apparatus at any radial dimension thereof.
5. The method of claim 1 wherein scoops are provided and immersed in one or more of the separated liquids traveling relative to the scoops to remove the separated liquid.
6. The method of claim 1 wherein the fluid stream defines a jet that has momentum and is directed to transfer energy from the jet to said rotating separator apparatus.

7. The method of claim 5 including providing a rotating annular surface at which the liquids are separated from the gas.

8. The method of claim 7 wherein said rotating annular surface is provided with a multitude of holes operating to pass liquid centrifugally away from gas in such a manner as to eliminate the transfer of forces from the fluid jet that would disrupt the separated liquids.

9. The method of claim 8 wherein an annular structure is provided and operated to separately collect liquid A of higher density and liquid B of lower density.

10. The method of claim 9 wherein the annular structure has two separate annular circular weir plates having inner circumferences of associated different radii, determined by the specific gravity of liquid A and liquid B and the centrifugal forces produced by the rotation of the apparatus.

11. The method of claim 10 wherein the said annular structure has a third annular circular plate with a smaller radius than either of the two weirs, preventing splash from one separated liquid into another and providing discrete channels for said separated liquids.

12. The method of operating a rotating separator apparatus to which fluid, including gas, and liquids, and solids are supplied in a fluid stream, which includes the following steps:
   a) separating gas from said stream at a first zone within said rotating separator apparatus,
   b) separating liquids from said stream into separate layers of different density at a second zone within said rotating separator apparatus, and
   c) removing said separated gas and separated liquids of different density from the said first and second zones of said rotating separator apparatus,
and wherein liquid reaction passages are provided and immersed in one or more of the separated liquids to remove the separated liquid, wherein said liquid reaction passages are provided to lead to a nozzle which converts the hydrostatic head produced by the centrifugal force field of said apparatus to kinetic energy, producing a torque on the rotating separator structure.

13. The method of operating a rotating separator apparatus to which fluid, including gas, and liquids, and solids are supplied in a fluid stream, which includes the following steps:
   a) separating gas from said stream at a first zone within said rotating separator apparatus,
   b) separating liquids from said stream into separate layers of different density at a second zone within said rotating separator apparatus, and
   c) removing said separated gas and separated liquids of different density from the said first and second zones of said rotating separator apparatus,
   d) providing a fluid means to periodically fluidize any solids within said rotating apparatus and to force the resulting solid and liquid mixture to flow in a generally downward direction,
   e) providing a vertical shaft and sloping end walls of the rotating separator apparatus to enable removal of said fluidized solids by gravity,
   f) providing a port at the bottom of the casing to enable removal of the fluidized solid mixture.

14. The method of claim 5 wherein said scoops are provided with contouring to convert the kinetic energy of the captured liquids into pressure.

15. The method of claim 12 wherein said liquid reaction passages are provided as immersed in the separated gas to add energy to the rotating separator apparatus.

16. The method of claim 1 including attaching an electric generator to the shaft to produce electric power.

17. The method of claim 1 including attaching a motor to the shalt to cause rotation of the rotating separator apparatus.

18. The method of claim 1 including attaching a pump to the shaft.

19. The method of claim 1 including attaching a compressor to the shaft.

20. The method of claim 1 where the fluids are natural gas, oil, and water.

21. The method of claim 1 where the fluids are carbon dioxide, liquid hydrocarbons, and amine solution.

22. A rotating separator apparatus to which fluid, including gas, and liquids, and solids are supplied in a fluid stream, which comprises:
   a) first means for separating gas from said stream at a first zone within said rotating separator apparatus,
   b) second means for separating liquids from said stream into separate layers of different density at a second zone within said rotating separator apparatus, and
   c) third means for removing said separated gas and separated liquids of different density from the said first and second zones of said rotating separator apparatus,
   d) and including longitudinally elongated vanes located to force the separated liquids to acquire the rotational velocity of the rotating apparatus at any radial dimension thereof,
   e) and including a rotating annular surface at which the liquids are separated from the gas,
   f) and wherein said surface defines a multitude of holes operating to pass liquid centrifugally away from gas in such a manner as to eliminate the transfer of forces from the fluid jet that would otherwise disrupt the separated liquids,
   g) and including an annular structure operated to separately collect liquid A of higher density and liquid B of lower density,
   h) and wherein wherein the annular structure has two separate annular circular weir plates having inner circumferences of associated different radii, determined by the specific gravity of liquid A and liquid B and the centrifugal forces produced by the rotation of the apparatus,
   i) and wherein the said annular structure has a third annular circular plate with a smaller radius than either of the two weirs, preventing splash from one separated liquid into another and providing discrete channels for said separated liquids,
   j) and including liquid reaction passages immersed in one or more of the separated liquids to remove the separated liquid, wherein said liquid reaction passages lead to a nozzle which converts the hydrostatic head produced by the centrifugal force field of said apparatus to kinetic energy, producing a torque on the rotating separator apparatus.

23. Apparatus of claim 22 including a vertical shaft supporting said zones, and a casing containing bearings to support the shaft to freely rotate, and seals containing all said liquids, and added means to remove the said separated liquids.

24. Apparatus of claim 22 including scoops immersed in one or more of the separated liquids traveling relative to the scoops to remove the separated liquid.

25. Apparatus of claim 22 wherein the fluid stream defines a jet that has momentum and is directed to transfer energy from the jet to said rotating separator apparatus.

26. Apparatus of claim 22 including:
d) means to periodically fluidize any solids within said rotating apparatus and to force the resulting solid and liquid mixture to flow in a generally downward direction,
e) a vertical shaft and sloping end walls of the rotating separator apparatus to enable removal of said fluidized solids by gravity,
f) port at the bottom of the casing to remove the fluidized solid mixture.

27. Apparatus of claim 5 wherein said scoops have contouring to convert the kinetic energy of the separated liquids into pressure.

28. A rotating separator apparatus to which fluid, including gas, and liquids, and solids are supplied in a fluid stream, which comprises:
a) first means for separating gas from said stream at a first zone within said rotating separator apparatus,
b) second means for separating liquids from said stream into separate layers of different density at a second zone within said rotating separator apparatus, and
c) third means for removing said separated gas and separated liquids of different density from the said first and second zones of said rotating separator apparatus,
d) and including longitudinally elongated vanes located to force the separated liquids to acquire the rotational velocity of the rotating apparatus at any radial dimension thereof,
e) and including a rotating annular surface at which the liquids are separated from the gas,
f) and wherein said surface defines a multitude of holes operating to pass liquid centrifugally away from gas in such a manner as to eliminate the transfer of forces from the fluid jet that would otherwise disrupt the separated liquids,
g) and including an annular structure operated to separately collect liquid A of higher density and liquid B of lower density,
h) and wherein wherein the annular structure has two separate annular circular weir plates having inner circumferences of associated different radii, determined by the specific gravity of liquid A and liquid B and the centrifugal forces produced by the rotation of the apparatus,
i) and wherein the said annular structure has a third annular circular plate with a smaller radius than either of the two weirs, preventing splash from one separated liquid into another and providing discrete channels for said separated liquids,
j) and including liquid reaction passages immersed in one or more of the separated liquids to remove the separated liquid, wherein said liquid reaction passages lead to a nozzle which converts the hydrostatic head produced by the centrifugal force field of said apparatus to kinetic energy, producing a torque on the rotating separator apparatus,
there being stationary volutes attached to a separator casing, and wherein liquid in reaction passages discharges into said volutes.

* * * * *